US012712624B2

(12) United States Patent
Lin

(10) Patent No.: US 12,712,624 B2
(45) Date of Patent: Aug. 18, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 172 days.

(21) Appl. No.: 18/219,423

(22) Filed: Jul. 7, 2023

(65) Prior Publication Data

US 2023/0353230 A1 Nov. 2, 2023

Related U.S. Application Data

(63) Continuation of application No. PCT/IB2021/000080, filed on Jan. 15, 2021.

(51) Int. Cl.
*H04L 5/12* (2006.01)
*H04B 7/10* (2017.01)
*H04B 7/155* (2006.01)

(52) U.S. Cl.
CPC ............. *H04B 7/1555* (2013.01); *H04B 7/10* (2013.01)

(58) Field of Classification Search
CPC ................................ H04B 7/1555; H04B 7/10
USPC ................ 375/262, 260, 259, 219, 295, 316
See application file for complete search history.

(56) References Cited

U.S. PATENT DOCUMENTS

2014/0321566 A1* 10/2014 Wu .......................... H04B 7/10 375/267
2016/0337864 A1* 11/2016 Song ...................... H01Q 21/24
2023/0189382 A1* 6/2023 Haustein ............... H04W 76/20 370/329

FOREIGN PATENT DOCUMENTS

KR 20200145683 A * 12/2020 ........... H04L 5/0092
WO 2021057490 A1 4/2021
WO 2021058576 A1 4/2021

OTHER PUBLICATIONS

Translation of KR 20200145683 Kim, Method and Apparatus for Configuring Cell in Non-Terrestrial Network, 2020 (Year: 2020).*
CATT: “Other Aspects of NR-NTN”, 3GPP Draft; R1-2007857, 3rd Generation Partnership Project (3GPP), Mobile Competence Centre; 650, Route Deslucioles; F-06921 Sophia-Antipolis Cedex; Francevol. RAN WG1, No. e-Meeting; 20201026202011 1324 Oct. 2020 (Oct. 24, 2020), XP051946536, Retrieved from the Internet: URL:https://ftp.3gpp.org/tsg_ran/WG1_RL1/TSGR1_103-e/Docs/R1-2007857.zipR1-2007857.docx [retrieved on Oct. 24, 2020]. 8 pages.

(Continued)

*Primary Examiner* — Zewdu A Kassa
(74) *Attorney, Agent, or Firm* — BAYES PLLC

(57) ABSTRACT

A method of wireless communication is provided. The method by a user equipment (UE) includes performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission. A UE and a base station are further provided.

16 Claims, 2 Drawing Sheets

(56) References Cited

OTHER PUBLICATIONS

Panasonic:“SSB, beam management and polarization signaling for NTN”,3GPP Draft; R1-2009026, 3rd Generation Partnership Project (3GPP), Mobile Competence Centre; 650, Route Deslucioles; F-06921 Sophia-Antipolis Cedex; Francevol. RAN WG1, No. e-Meeting; 202010262020110623 Oct. 2020 (Oct. 23, 2020), XP051945461,Retrieved from the Internet:URL:https://ftp.3gpp.org/tsg_ran/WG1_RL1/TSGR1_103-e/Docs/R1-2009026.zipR1-2009026.docx[retrieved on Oct. 23, 2020]. 4 pages.

Mediatek Inc: “Summary #3 of 8.4.4 OtherAspects of NR-NTN”,3GPP Draft; R1-2009736, 3rd GenerationPartnership Project (3GPP), Mobile Competence Centre ; 650, Route Deslucioles ; F-06921 Sophia-Antipolis Cedex; Francevol. RAN WG1, No. e meeting ;202010262020111314 Nov. 2020 (Nov. 14, 2020),XP051954380,Retrieved from the Internet:URL:https://ftp.3gpp.org/tsg_ran/WG1_RL1/TSGR1_103-e/Docs/R1-2009736.zip. 47 pages.

International Search Report in the international application No. PCT/IB2021/000080, mailed on Jan. 11, 2022. 7 pages.

Written Opinion of the International Search Authority in the international application No. PCT/IB2021/000080, mailed on Jan. 11, 2022. 16 pages.

“Solutions for NR to support non-terrestrial networks (NTN) (Release 16)”,3GPP TR 38.821 V16.0.0 (Dec. 2019). 140 pages.

* cited by examiner

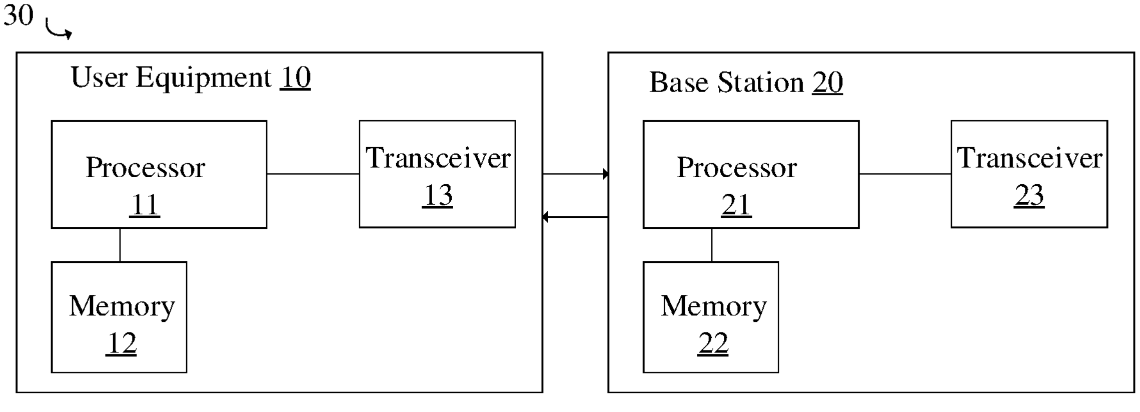

FIG. 1A

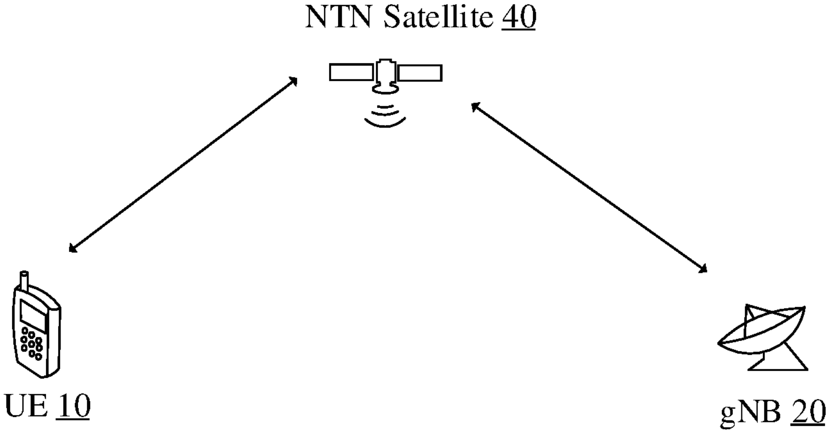

Performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission

Performing communication, by the base station with a user equipment (UE), wherein the communication comprises that the base station is configured to transmit, to the UE, a first indication comprising an antenna polarization used by the base station and/or a satellite to transmit and/or receive a transmission; and/or the base station is configured to transmit, to the UE, a second indication comprising the antenna polarization used by the UE to transmit and/or receive a transmission

FIG. 3

APPARATUS AND METHOD OF WIRELESS COMMUNICATION

CROSS-REFERENCE TO RELATED APPLICATION(S)

This application is a continuation of International Patent Application No. PCT/IB2021/000080 filed on Jan. 15, 2021, which is incorporated herein by reference in its entirety.

BACKGROUND

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g. extreme rural, or due to high deployment cost, e.g. middle of ocean or mountain peak. Nowadays, the satellite communication is a separate technology to a 3rd generation partnership project (3GPP) cellular technology. Coming to 5G era, these two technologies can merge together, i.e. we can imagine having a 5G terminal that can access to a cellular network and a satellite network. The NTN can be good candidate technology for this purpose. It is to be designed based on 3GPP new radio (NR) with necessary enhancement.

Satellite may implement active antennas which has configurable polarization. On a user equipment (UE) side, according to different type of UEs, e.g. smartphone, or customer provided equipment (CPE) or other satellite dedicated receiver, etc., an antenna polarization on the UE side may be varying. In a non-terrestrial network, a gNB may need to communicate with different UE type with different antenna polarizations. For a gNB, how to ensure that a gNB antenna polarization and/or a satellite antenna polarization is suitable for a UE antenna polarization when the gNB and/or the satellite is in communication with the UE is an open issue.

Therefore, there is a need for an apparatus (such as a user equipment (UE) and/or a base station) and a method of wireless communication, which can solve issues in the prior art, provide a method for antenna polarization indication, provide a good communication performance, and/or provide high reliability.

SUMMARY

The present disclosure relates to the field of communication systems, and proposes an apparatus (such as a user equipment (UE) and/or a base station) and a method of wireless communication.

In a first aspect of the present disclosure, a method of wireless communication by a user equipment (UE) comprises performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission.

In a second aspect of the present disclosure, a method of wireless communication by a base station comprises performing communication, by the base station with a user equipment (UE), wherein the communication comprises that the base station is configured to transmit, to the UE, a first indication comprising an antenna polarization used by the base station and/or a satellite to transmit and/or receive a transmission; and/or the base station is configured to transmit, to the UE, a second indication comprising the antenna polarization used by the UE to transmit and/or receive a transmission.

In a third aspect of the present disclosure, a user equipment comprises a memory, a transceiver, and a processor coupled to the memory and the transceiver. The processor is configured to perform communication with a base station, wherein the communication comprises that the transceiver is configured to receive, from the base station, a first indication comprising an antenna polarization used by the base station and/or a satellite to transmit and/or receive a transmission; and/or the transceiver is configured to receive, from the base station, a second indication comprising the antenna polarization used by the transceiver to transmit and/or receive a transmission.

In a fourth aspect of the present disclosure, a base station comprises a memory, a transceiver, and a processor coupled to the memory and the transceiver. The processor is configured to perform communication with a user equipment (UE), wherein the communication comprises that the transceiver is configured to transmit, to the UE, a first indication comprising an antenna polarization used by the base station and/or a satellite to transmit and/or receive a transmission; and/or the transceiver is configured to transmit, to the UE, a second indication comprising the antenna polarization used by the UE to transmit and/or receive a transmission.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1A is a block diagram of one or more user equipments (UEs) and a base station (e.g., gNB or eNB) of communication in a communication network system (e.g., non-terrestrial network (NTN) or a terrestrial network) according to an embodiment of the present disclosure.

FIG. 1B is a block diagram of one or more user equipments (UEs) and a base station (e.g., gNB or eNB) of communication in a non-terrestrial network (NTN) system according to an embodiment of the present disclosure.

FIG. 2 is a flowchart illustrating a method of wireless communication performed by a user equipment (UE) according to an embodiment of the present disclosure.

FIG. 3 is a flowchart illustrating a method of wireless communication performed by a base station according to an embodiment of the present disclosure.

DETAILED DESCRIPTION

Figures 4, 5, 6:
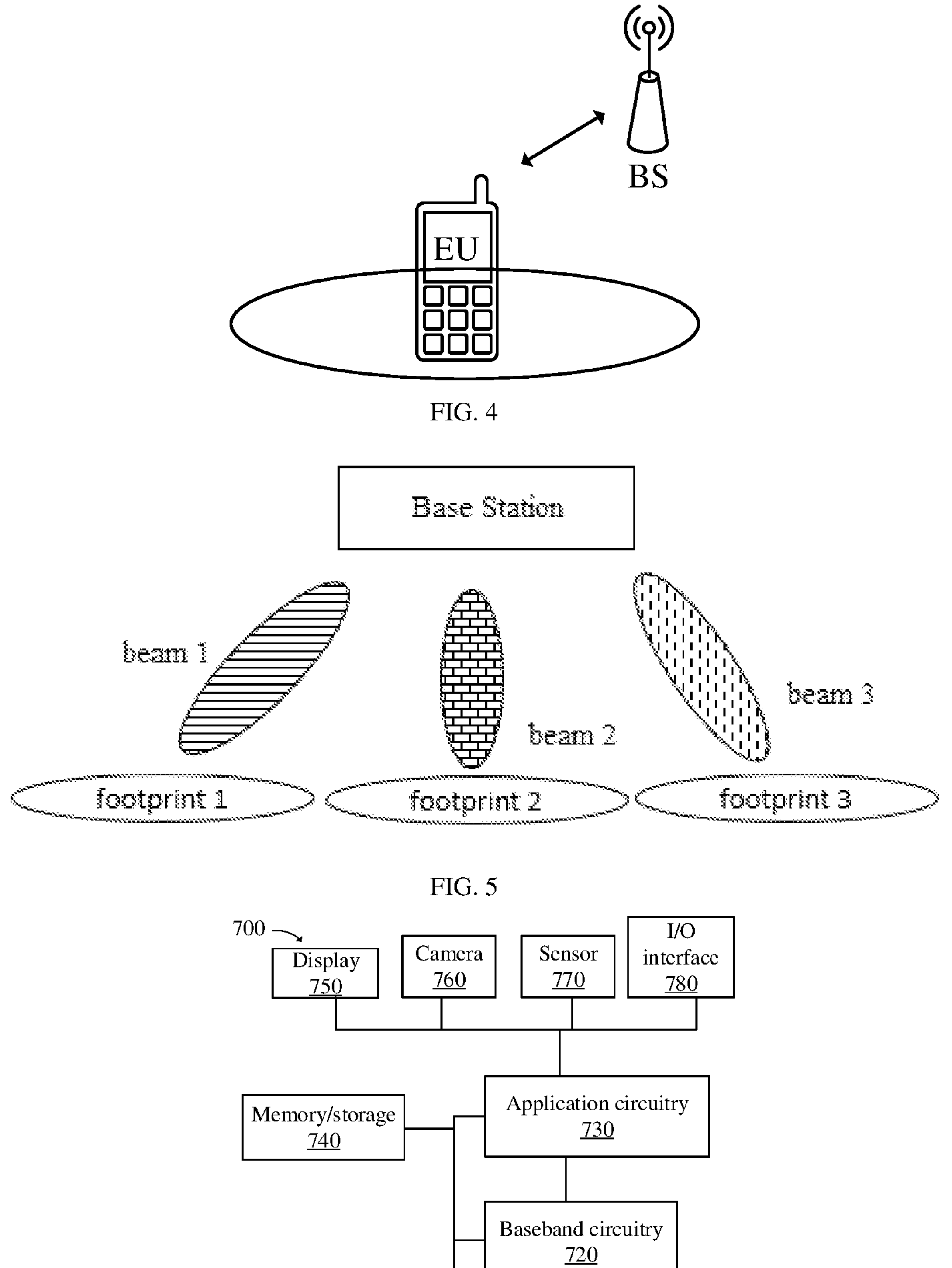
FIG. 4 is a schematic diagram illustrating a communication system including a base station (BS) and a UE according to an embodiment of the present disclosure.
FIG. 5 is a schematic diagram illustrating that a BS transmits 3 beams to the ground forming 3 footprints according to an embodiment of the present disclosure.
FIG. 6 is a block diagram of a system for wireless communication according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

FIG. 1A illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the communication between the UE 10 and the base station 20 comprises non-terrestrial network (NTN) communication. In some embodiments, the base station 20 comprises spaceborne platform or airborne platform or high altitude platform station. The base station 20 can communicate with the UE 10 via a spaceborne platform or airborne platform, e.g. NTN satellite 40, as illustrated in FIG. 1B.

Spaceborne platform includes satellite and the satellite includes low earth orbiting (LEO) satellite, medium earth orbiting (MEO) satellite and geostationary earth orbiting (GEO) satellite. While the satellite is moving, the LEO and MEO satellite is moving with regard to a given location on earth. However, for GEO satellite, the GEO satellite is relatively static with regard to a given location on earth.

In some embodiments, the processor 11 is configured to perform communication with the base station 20, wherein the communication comprises that the transceiver 13 is configured to receive, from the base station 20 or the satellite 40, a first indication comprising an antenna polarization used by the base station 20 and/or the satellite 40 to transmit and/or receive a transmission; and/or the transceiver 13 is configured to receive, from the base station 20, a second indication comprising the antenna polarization used by the transceiver 13 to transmit and/or receive a transmission. This can solve issues in the prior art, provide a method for antenna polarization indication, provide a good communication performance, and/or provide high reliability. Further, the base station 20 can ensure that a base station antenna polarization and/or a satellite antenna polarization is suitable for a UE antenna polarization when the base station and/or the satellite is in communication with the UE 10.

In some embodiments, the processor 21 is configured to perform communication with the user equipment (UE) 10, wherein the communication comprises that the transceiver 23 is configured to transmit, to the UE 10, a first indication comprising an antenna polarization used by the base station 20 and/or the satellite 40 to transmit and/or receive a transmission; and/or the transceiver 23 is configured to transmit, to the UE 10, a second indication comprising the antenna polarization used by the UE 10 to transmit and/or receive a transmission. This can solve issues in the prior art, provide a method for antenna polarization indication, provide a good communication performance, and/or provide high reliability. Further, the base station 20 can ensure that a base station antenna polarization and/or a satellite antenna polarization is suitable for a UE antenna polarization when the base station and/or the satellite is in communication with the UE 10.

FIG. 2 illustrates a method 200 of wireless communication by a user equipment (UE) according to an embodiment of the present disclosure. In some embodiments, the method 200 includes: a block 202, performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission. This can solve issues in the prior art, provide a method for antenna polarization indication, provide a good communication performance, and/or provide high reliability. Further, the base station can ensure that a base station antenna polarization and/or a satellite antenna polarization is suitable for a UE antenna polarization when the base station and/or the satellite is in communication with the UE.

FIG. 3 illustrates a method 300 of wireless communication by a base station according to an embodiment of the present disclosure. In some embodiments, the method 300 includes: a block 302, performing communication, by the base station with a user equipment (UE), wherein the communication comprises that the base station is configured to transmit, to the UE, a first indication comprising an antenna polarization used by the base station and/or a satellite to transmit and/or receive a transmission; and/or the base station is configured to transmit, to the UE, a second indication comprising the antenna polarization used by the UE to transmit and/or receive a transmission. This can solve issues in the prior art, provide a method for antenna polarization indication, provide a good communication performance, and/or provide high reliability. Further, the base station can ensure that a base station antenna polarization and/or a satellite antenna polarization is suitable for a UE antenna polarization when the base station and/or the satellite is in communication with the UE.

In some embodiments, the first indication and/or the second indication are indicated in at least one of the followings: a system information, a UE-specific radio resource control (RRC) message, a medium access control (MAC) control element (CE), or downlink control information (DCI). In some embodiments, the antenna polarization comprises a transmitter antenna polarization and/or a receiver antenna polarization. In some embodiments, the antenna polarization comprises at least one of the followings: a first polarization type, a second polarization type, or a third polarization type. In some embodiments, the first polarization type comprises a linear polarization. In some embodiments, the second polarization type comprises a right-hand circular polarization (RHCP). In some embodiments, the third polarization type comprises a left-hand circular polarization (LHCP). In some embodiments, when absence of the first indication and/or the second indication, a default polarization is used for transmission and/or for reception. In some embodiments, the default polarization comprises the linear polarization. In some embodiments, when the first indication is indicated in the system information, a first transmission is transmitted and/or received with the antenna polarization; or when the second indication is indicated in the system information, a second transmission is transmitted and/or received with the antenna polarization.

In some embodiments, the first transmission comprises a downlink transmission. In some embodiments, the downlink transmission comprises at least one of the followings: a physical downlink shared channel (PDSCH), a physical downlink control channel (PDCCH), a synchronization signal block (SSB), or a channel state information reference signal (CSI-RS). In some embodiments, the second transmission comprises an uplink transmission. In some embodiments, the uplink transmission comprises at least one of the followings: a physical uplink shared channel (PUSCH), a physical uplink control channel (PUCCH), a sounding reference signal (SRS), or a physical random access channel (PRACH). In some embodiments, the first transmission is transmitted from the base station and/or a satellite to the UE. In some embodiments, the second transmission is transmitted from the UE to the base station and/or the satellite. In some embodiments, when the first indication is indicated in the system information and the first transmission is transmitted with the antenna polarization, a transmit antenna of the base station and/or the satellite uses the antenna polarization. In some embodiments, when the first indication is indicated in the system information and the first transmission is received with the antenna polarization, a receiver antenna of the UE uses the antenna polarization.

In some embodiments, when the second indication is indicated in the system information and the second transmission is transmitted with the antenna polarization, a transmit antenna of the UE uses the antenna polarization. In some embodiments, when the second indication is indicated in the system information and the second transmission is received with the antenna polarization, a receiver antenna of the base station and/or the satellite uses the antenna polarization. In some embodiments, the UE is configured to adjust the transmitter antenna polarization and/or the receiver antenna polarization of the UE to match with the transmitter antenna polarization and/or the receiver antenna polarization of the base station and/or the satellite antenna polarization. In some embodiments, when the first indication is indicated in the UE-specific RRC message or the DCI and the first transmission is transmitted with the antenna polarization, a transmit antenna of the base station and/or the satellite uses the antenna polarization. In some embodiments, when the first indication is indicated in the UE-specific RRC message or the DCI and the first transmission is received with the antenna polarization, a receiver antenna of the UE uses the antenna polarization.

In some embodiments, when the second indication is indicated in the UE-specific RRC message or the DCI and the second transmission is transmitted with the antenna polarization, a transmit antenna of the UE uses the antenna polarization. In some embodiments, when the second indication is indicated in the UE-specific RRC message or the DCI and the second transmission is received with the antenna polarization, a receiver antenna of the base station and/or the satellite uses the antenna polarization. In some embodiments, the UE is configured to adjust the transmitter antenna polarization and/or the receiver antenna polarization of the UE to match with the transmitter antenna polarization and/or the receiver antenna polarization of the base station and/or the satellite antenna polarization. In some embodiments, the first indication and/or the second indication is configured in a bandwidth part (BWP) configuration information element (IE) and/or a measurement object (MeasObj) IE. In some embodiments, the MeasObj IE is an RRC configuration for synchronization signal and physical broadcast channel (SS/PBCH) block(s) intra/inter-frequency measurements and/or CSI-RS intra/inter-frequency measurements. In some embodiments, in the MeasObj (MO) IE, the base station is configured to configure an antenna polarization for all cells in the same MO identifier (ID). In some embodiments, in the MO IE, the base station is configured to configure a set of antenna polarizations, each of the antenna polarizations corresponds to one or more cells in the MO ID. In some embodiments, the configured antenna polarization indicates the SSB and/or thee CSI-RS are transmitted with the configured antenna polarization. In some embodiments, the configured antenna polarization indicates that the UE uses the configured antenna polarization to receive the SSB and/or the CSI-RS. In some embodiments, the first indication and/or the second indication is associated with one or more serving cells. In some embodiments, the first indication and/or the second indication is configured in a reference signal configuration.

In some embodiments, when the first indication is indicated in the MAC CE and the first transmission is transmitted with the antenna polarization, a transmit antenna of the base station and/or the satellite uses the antenna polarization. In some embodiments, when the first indication is indicated in the MAC CE and the first transmission is received with the antenna polarization, a receiver antenna of the UE uses the antenna polarization. In some embodiments, when the second indication is indicated in the MAC CE and the second transmission is transmitted with the antenna polarization, a transmit antenna of the UE uses the antenna polarization. In some embodiments, when the second indication is indicated in the MAC CE and the second transmission is received with the antenna polarization, a receiver antenna of the base station and/or the satellite uses the antenna polarization. In some embodiments, the UE is configured to adjust the transmitter antenna polarization and/or the receiver antenna polarization of the UE to match with the transmitter antenna polarization and/or the receiver antenna polarization of the base station and/or the satellite antenna polarization. In some embodiments, the first indication and/or the second indication indicated in the MAC CE comprises change and/or activation or deactivation of the antenna polarization.

In some embodiments, the first indication and/or the second indication indicated in the MAC CE comprises that the UE is configured to receive a set of antenna polarizations from the base station. In some embodiments, the set of antenna polarizations comprises the linear polarization, the RHCP, and the LHCP. In some embodiments, the first indication and/or the second indication indicated in the MAC CE comprises that the UE is indicated by the base station to change one antenna polarization to another antenna polarization from the set of antenna polarizations. In some embodiments, the UE is configured to report to the base station, a UE capability of supporting one or more antenna polarizations. In some embodiments, the UE capability of supporting one or more antenna polarizations comprises the UE supports the one or more antenna polarizations for transmit antenna and/or receive antenna. In some embodiments, the UE is indicated by the base station whether to increase transmit power to compensate for polarization loss. In some embodiments, when the UE determines that for the transmission transmitted from the UE, there is a polarization mismatch, the UE increases a transmit power to compensate for polarization loss.

In some embodiments, the polarization loss is pre-configured or pre-defined. In some embodiments, the polarization loss is up to 3 dB. In some embodiments, the polarization loss is cause by different antenna polarizations used on the base station or the satellite and the UE. In some embodiments, the transmit power increased by the UE is equal to the polarization loss. In some embodiments, the UE is indicated with the DCI by the base station, and the DCI indicates that the second transmission increases the transmit power or without increasing the transmit power to compensate for polarization loss. In some embodiments, the DCI comprises an indication field used to indicate whether or not the UE needs to increase the transmit power to compensate for polarization loss. In some embodiments, the indication field is a transmit power control (TPC) command for the second transmission. In some embodiments, the DCI has a format of at least one of the followings: DCI format 0_0, DCI format 0_1, DCI format 0_2, DCI format 2_2, or DCI format 2_0.

FIG. 4 illustrates a communication system including a base station (BS) and a UE according to another embodiment of the present disclosure. Optionally, the communication system may include more than one base station, and each of the base stations may connect to one or more UEs. In this disclosure, there is no limit. As an example, the base station illustrated in FIG. 1A may be a moving base station, e.g. spaceborne vehicle (satellite) or airborne vehicle (drone). The UE can transmit transmissions to the base station and the UE can also receive the transmission from the base station. Optionally, not shown in FIG. 4, the moving base station can also serve as a relay which relays the received transmission from the UE to a ground base station or vice versa.

Spaceborne platform includes satellite and the satellite includes LEO satellite, MEO satellite and GEO satellite. While the satellite is moving, the LEO and MEO satellite is moving with regards to a given location on earth. However, for GEO satellite, the GEO satellite is relatively static with regards to a given location on earth. A moving base station or satellite, e.g. in particular for LEO satellite or drone, communicates with a user equipment (UE) on the ground. Due to long distance between the UE and the base station on satellite, the beamformed transmission is needed to extend the coverage.

Optionally, as illustrated in FIG. 5, where a base station is integrated in a satellite or a drone, and the base station transmits one or more beams to the ground forming one or more coverage areas called footprint. In FIG. 5, an example illustrates that the BS transmits three beams (beam 1, beam 2 and beam3) to form three footprints (footprint 1, 2 and 3), respectively. Optionally, 3 beams are transmitted at 3 different frequencies. In this example, the bit position is associated with a beam. FIG. 5 illustrates that, in some embodiments, a moving base station, e.g. in particular for LEO satellite or drone, communicates with a user equipment (UE) on the ground. Due to long distance between the UE and the base station on satellite, the beamformed transmission is needed to extend the coverage. As illustrated in FIG. 5, where a base station is transmitting three beams to the earth forming three coverage areas called footpoints. Moreover, each beam may be transmitted at dedicated frequencies so that the beams for footprint 1, 2 and 3 are non-overlapped in a frequency domain. The advantage of having different frequencies corresponding to different beams is that the inter-beam interference can be minimized.

Satellite may implement active antennas which has configurable polarization, there are at least the following polarizations can be implemented: linear polarization, right-hand circular polarization (RHCP), or left-hand circular polarization (LHCP). On the UE side, according to different type of UEs, e.g. smartphone, or customer provided equipment (CPE) or other satellite dedicated receiver, etc., the antenna polarization on the UE side may be varying. In a non-terrestrial network, a gNB may need to communicate with different UE type with different antenna polarizations. In this case, the gNB shall ensure that a satellite antenna polarization is suitable for a UE antenna polarization when the satellite and the UE are communicating.

In some examples, a gNB indicates the satellite antenna polarization or gNB antenna polarization in at least one of the followings: system information, UE-specific RRC message, MAC-CE, or DCI.

Example 1: a gNB indicates in a system information that a transmission transmitted from the gNB side (downlink transmission) and/or a transmission received by the gNB (uplink transmission) is used with an antenna polarization, where the antenna polarization includes at least one of the followings: linear polarization, RHCP, or LHCP. In this example, a downlink transmission is used with the antenna polarization means that the gNB transmit antenna uses the antenna polarization. An uplink transmission is used with the antenna polarization means that the gNB receive antenna uses the antenna polarization. The advantage is that when a UE knows the gNB or the serving satellite transmit and/or receive antenna polarization, it can adjust its own polarization accordingly to match with the gNB or the serving satellite. Thus, the communication link robustness is enhanced, e.g. avoiding the polarization mis-match loss. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

Example 2: a gNB indicates in a UE-specific RRC message that the gNB will use the antenna polarization to receive an uplink transmission and/or to perform a downlink transmission. Optionally, the polarization indication is configured in the BWP configuration IE and/or a measurement object (MeasObj) IE. Optionally, the MeasObj IE is an RRC configuration for SS/PBCH block(s) intra/inter-frequency measurements and/or CSI-RS intra/inter-frequency measurements. In the MeasObj (MO) IE, the gNB configures an antenna polarization for all the cells in the same MO ID. Optionally, in the MO IE, the gNB configures a set of antenna polarizations, each of the antenna polarizations corresponds to one or more cells in the MO ID. The configured antenna polarization indicates the SSB and/or CSI-RS are transmitted with the configured antenna polarization. Optionally, the configured antenna polarization indicates that the UE shall use the configured antenna polarization to receive the SSB and/or CSI-RS. The advantage is that when a UE knows the gNB or the serving satellite transmit and/or receive antenna polarization, it can adjust its own polarization accordingly to match with the gNB or the serving satellite. Thus, the communication link robustness is enhanced, e.g. avoiding the polarization mis-match loss. Optionally, the gNB indicates in the UE-specific RRC message that the UE uses the antenna polarization to perform an uplink transmission and/or to receive a downlink transmission. The advantage is that the gNB can control the UE's antenna polarization to be matched with gNB's or the serving satellite's antenna polarization. Thus, the communication link robustness is enhanced, e.g. avoiding the polarization mis-match loss. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

Example 3: a gNB indicates in a MAC-CE that an antenna polarization is changed and/or activated or deactivated. The gNB may configure a set of polarizations, e.g. linear, RHCP and LHCP. The gNB may use MAC-CE to indicate the UE that the polarization is switched from one to the other. The antenna polarization is used on the gNB side for transmit antenna polarization and/or receive antenna polarization. Optionally, the antenna polarization is used on the UE side for transmit antenna polarization and/or receive antenna polarization. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

Example 4: a UE reports to the gNB about the UE capability of supporting different antenna polarization. In some examples, the UE reports that it can only support one polarization for transmit antenna and/or receive antenna. The one polarization includes at least one of the followings: linear polarization, RHCP, or LHCP. In some examples, the UE reports that it can support more than one antenna polarizations. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

Example 5: a gNB indicates in a DCI that a scheduled downlink transmission, e.g. PDSCH, is transmitted with an antenna polarization on the gNB side, where the antenna polarization is at least one of the followings: linear, RHCP or LHCP. Optionally, a gNB indicates in a DCI that the UE should receive the scheduled downlink transmission with the first polarization on the UE side. Optionally, a gNB indicates in a DCI that a scheduled uplink transmission, e.g. PUSCH, PUCCH, SRS or PRACH, should be transmitted using the antenna polarization on the UE side. Optionally, a gNB indicates in a DCI that the gNB will receive a scheduled uplink transmission, e.g. PUSCH, PUCCH, SRS or PRACH, with the antenna polarization. In some examples, when the UE determines that for an uplink transmission, there is a polarization mis-match, leading to a polarization loss, the UE shall increase the transmit power to compensate for the polarization loss, wherein the polarization loss is pre-configured or pre-defined. Optionally, the polarization loss is up to 3 dB. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

Example 6: in some examples, the gNB may indicate the UE whether to increase an uplink transmission power to compensate for a polarization loss. The polarization loss is due to a different antenna polarization used on the transmitter side and the receiver side, e.g. RHCP on gNB side and linear polarization on UE side. Optionally, the increased transmit power is equal to the polarization loss, which is 3 dB. In some examples, the gNB indicates in a DCI that the scheduled uplink transmission, e.g. PUSCH and/or PUCCH and/or SRS and/or PRACH, should increase 3 dB transmit power or without increasing transmit power to compensate for the polarization loss. Optionally, in the DCI, there is an indication field used to indicate whether or not the UE needs to increase transmit power to compensate for the polarization loss. In some embodiments, communication between the UE and the gNB comprises that the UE is configured to receive, from the gNB, a first indication comprising an antenna polarization used by the gNB and/or a satellite to transmit and/or receive a transmission; and/or the UE is configured to receive, from the gNB, a second indication comprising the antenna polarization used by the UE to transmit and/or receive a transmission. Optionally, the first indication and/or the second indication is associated with one or more serving cells. Optionally, the first indication and/or the second indication corresponds to a cell. Each cell corresponds to the first indication and/or the second indication. For example, first Indication 1 corresponds to cell 1, first indication 2 corresponds to cell 2, and first indication 3 corresponds to cell 3. Optionally, the first indication and/or the second indication is configured in a reference signal configuration. For example, when a configured reference signal is downlink or uplink, the gNB can indicate polarization. For example, 1) RadioLinkMonitoringConfig or reference signal RadioLinkMonitoringConfig IE for RLM is used; 2) reference signal SRS, SRS-Config IE, or SRS-ResourceSet IE for uplink is used; 3) PRACH is configured by the polarization indicated by the gNB, RACH-ConfigCommon IE, or RACH-ConfigDedicated; 4) for the polarization indicated by PDCCH, ControlResourceSet IE is used; 5) for the polarization indicated by PUCCH, PUCCH-Config IE is used; or 6) for the polarization is indicated by PDSCH, PDSCH-Config IE is used.

In some examples, the indication field is TPC command for scheduled PUSCH. In some examples, the DCI has a format of at least one of the followings: DCI format 0_0, DCI format 0_1, DCI format 0_2, DCI format 2_2 or DCI format 2_0.

It is to note that some of the examples presented previously may not be mutual exclusive and may be combined together. Thus, we do not give further examples for such combinations.

Commercial interests for some embodiments are as follows. 1. Solving issues in the prior art. 2. Providing a method for antenna polarization indication. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

Additional Embodiments

Embodiment 1. A wireless communication method by a user equipment (UE), comprising:

performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission.

Embodiment 2. The method of embodiment 1, wherein the first indication and/or the second indication are indicated in at least one of the followings: a system information, a UE-specific radio resource control (RRC) message, a medium access control (MAC) control element (CE), or downlink control information (DCI).

Embodiment 3. The method of embodiment 1 or 2, wherein the antenna polarization comprises a transmitter antenna polarization and/or a receiver antenna polarization.

Embodiment 4. The method of any one of embodiments 1 to 3, wherein the antenna polarization comprises at least one of the followings: a first polarization type, a second polarization type, or a third polarization type.

Embodiment 5. The method of embodiment 4, wherein the first polarization type comprises a linear polarization.

Embodiment 6. The method of embodiment 4 or 5, wherein the second polarization type comprises a right-hand circular polarization (RHCP).

Embodiment 7. The method of any one of embodiments 4 to 6, wherein the third polarization type comprises a left-hand circular polarization (LHCP).

Embodiment 8. The method of any one of embodiments 1 to 7, wherein when absence of the first indication and/or the second indication, a default polarization is used for transmission and/or for reception.

Embodiment 9. The method of embodiment 8, wherein the default polarization comprises the linear polarization.

Embodiment 10. The method of any one of embodiments 2 to 9, wherein when the first indication is indicated in the system information, a first transmission is transmitted and/or received with the antenna polarization; or when the second indication is indicated in the system information, a second transmission is transmitted and/or received with the antenna polarization.

Embodiment 11. The method of embodiment 10, wherein the first transmission comprises a downlink transmission.

Embodiment 12. The method of embodiment 11, wherein the downlink transmission comprises at least one of the followings: a physical downlink shared channel (PDSCH), a physical downlink control channel (PDCCH), a synchronization signal block (SSB), or a channel state information reference signal (CSI-RS).

Embodiment 13. The method of any one of embodiments 10 to 12, wherein the second transmission comprises an uplink transmission.

Embodiment 14. The method of embodiment 13, wherein the uplink transmission comprises at least one of the followings: a physical uplink shared channel (PUSCH), a physical uplink control channel (PUCCH), a sounding reference signal (SRS), or a physical random access channel (PRACH).

Embodiment 15. The method of any one of embodiments 10 to 14, wherein the first transmission is transmitted from the base station and/or a satellite to the UE.

Embodiment 16. The method of any one of embodiments 10 to 15, wherein the second transmission is transmitted from the UE to the base station and/or the satellite.

Embodiment 17. The method of any one of embodiments 10 to 16, wherein when the first indication is indicated in the system information and the first transmission is transmitted with the antenna polarization, a transmit antenna of the base station and/or the satellite uses the antenna polarization.

Embodiment 18. The method of any one of embodiments 10 to 17, wherein when the first indication is indicated in the system information and the first transmission is received with the antenna polarization, a receiver antenna of the UE uses the antenna polarization.

Embodiment 19. The method of any one of embodiments 10 to 18, wherein when the second indication is indicated in the system information and the second transmission is transmitted with the antenna polarization, a transmit antenna of the UE uses the antenna polarization.

Embodiment 20. The method of any one of embodiments 10 to 19, wherein when the second indication is indicated in the system information and the second transmission is received with the antenna polarization, a receiver antenna of the base station and/or the satellite uses the antenna polarization.

Embodiment 21. The method of any one of embodiments 10 to 20, wherein the UE is configured to adjust the transmitter antenna polarization and/or the receiver antenna polarization of the UE to match with the transmitter antenna polarization and/or the receiver antenna polarization of the base station and/or the satellite antenna polarization.

Embodiment 22. The method of any one of embodiments 10 to 21, wherein when the first indication is indicated in the UE-specific RRC message or the DCI and the first transmission is transmitted with the antenna polarization, a transmit antenna of the base station and/or the satellite uses the antenna polarization.

Embodiment 23. The method of any one of embodiments 7 to 22, wherein when the first indication is indicated in the UE-specific RRC message or the DCI and the first transmission is received with the antenna polarization, a receiver antenna of the UE uses the antenna polarization.

Embodiment 24. The method of any one of embodiments 10 to 23, wherein when the second indication is indicated in the UE-specific RRC message or the DCI and the second transmission is transmitted with the antenna polarization, a transmit antenna of the UE uses the antenna polarization.

Embodiment 25. The method of any one of embodiments 10 to 24, wherein when the second indication is indicated in the UE-specific RRC message or the DCI and the second transmission is received with the antenna polarization, a receiver antenna of the base station and/or the satellite uses the antenna polarization.

Embodiment 26. The method of any one of embodiments 10 to 25, wherein the UE is configured to adjust the transmitter antenna polarization and/or the receiver antenna polarization of the UE to match with the transmitter antenna polarization and/or the receiver antenna polarization of the base station and/or the satellite.

Embodiment 27. The method of any one of embodiments 22 to 26, wherein the first indication and/or the second indication is configured in a bandwidth part (BWP) configuration information element (IE) and/or a measurement object (MeasObj) IE.

Embodiment 28. The method of embodiment 27, wherein the MeasObj IE is an RRC configuration for synchronization signal and physical broadcast channel (SS/PBCH) block(s) intra/inter-frequency measurements and/or CSI-RS intra/inter-frequency measurements.

Embodiment 29. The method of embodiment 27 or 28, wherein in the MeasObj (MO) IE, the base station is configured to configure an antenna polarization for all cells in the same MO identifier (ID).

Embodiment 30. The method of any one of embodiments 27 to 29, wherein in the MO IE, the base station is configured to configure a set of antenna polarizations, each of the antenna polarizations corresponds to one or more cells in the MO ID.

Embodiment 31. The method of embodiment 30, wherein the configured antenna polarization indicates the SSB and/or thee CSI-RS are transmitted with the configured antenna polarization.

Embodiment 32. The method of embodiment 30 or 31, wherein the configured antenna polarization indicates that the UE uses the configured antenna polarization to receive the SSB and/or the CSI-RS.

Embodiment 33. The method of any one of embodiments 27 to 32, wherein the first indication and/or the second indication is associated with one or more serving cells.

Embodiment 34. The method of any one of embodiments 1 to 33, wherein the first indication and/or the second indication is configured in a reference signal configuration.

Embodiment 35. The method of any one of embodiments 10 to 34, wherein when the first indication is indicated in the MAC CE and the first transmission is transmitted with the antenna polarization, a transmit antenna of the base station and/or the satellite uses the antenna polarization.

Embodiment 36. The method of any one of embodiments 10 to 35, wherein when the first indication is indicated in the MAC CE and the first transmission is received with the antenna polarization, a receiver antenna of the UE uses the antenna polarization.

Embodiment 37. The method of any one of embodiments 10 to 36, wherein when the second indication is indicated in the MAC CE and the second transmission is transmitted with the antenna polarization, a transmit antenna of the UE uses the antenna polarization.

Embodiment 38. The method of any one of embodiments 10 to 37, wherein when the second indication is indicated in the MAC CE and the second transmission is received with the antenna polarization, a receiver antenna of the base station and/or the satellite uses the antenna polarization.

Embodiment 39. The method of any one of embodiments 10 to 38, wherein the UE is configured to adjust the transmitter antenna polarization and/or the receiver antenna polarization of the UE to match with the transmitter antenna polarization and/or the receiver antenna polarization of the base station and/or the satellite antenna polarization.

Embodiment 40. The method of any one of embodiments 35 to 39, wherein the first indication and/or the second indication indicated in the MAC CE comprises change and/or activation or deactivation of the antenna polarization.

Embodiment 41. The method of any one of embodiments 35 to 40, wherein the first indication and/or the second indication indicated in the MAC CE comprises that the UE is configured to receive a set of antenna polarizations from the base station.

Embodiment 42. The method of embodiment 41, wherein the set of antenna polarizations comprises the linear polarization, the RHCP, and the LHCP.

Embodiment 43. The method of embodiment 41 or 42, wherein the first indication and/or the second indication indicated in the MAC CE comprises that the UE is indicated by the base station to change one antenna polarization to another antenna polarization from the set of antenna polarizations.

Embodiment 44. The method of any one of embodiments 1 to 43, wherein the UE is configured to report to the base station, a UE capability of supporting one or more antenna polarizations.

Embodiment 45. The method of embodiment 44, wherein the UE capability of supporting one or more antenna polarizations comprises that the UE supports the one or more antenna polarizations for transmit antenna and/or receive antenna.

Embodiment 46. The method of any one of embodiments 1 to 45, wherein the UE is indicated by the base station whether to increase transmit power to compensate for polarization loss.

Embodiment 47. The method of any one of embodiments 1 to 46, wherein when the UE determines that for the second transmission, there is a polarization mismatch, the UE increases a transmit power to compensate for polarization loss.

Embodiment 48. The method of embodiment 46 or 47, wherein the polarization loss is pre-configured or pre-defined.

Embodiment 49. The method of any one of embodiments 46 to 48, wherein the polarization loss is up to 3 dB.

Embodiment 50. The method of any one of embodiments 46 to 49, wherein the polarization loss is cause by different antenna polarizations used on the base station or the satellite and the UE.

Embodiment 51. The method of any one of embodiments 46 to 50, wherein the transmit power increased by the UE is equal to the polarization loss.

Embodiment 52. The method of any one of embodiments 46 to 51, wherein the UE is indicated with the DCI by the base station, and the DCI indicates that the second transmission increases the transmit power or without increasing the transmit power to compensate for polarization loss.

Embodiment 53. The method of any one of embodiments 46 to 52, wherein the DCI comprises an indication field used to indicate whether or not the UE needs to increase the transmit power to compensate for polarization loss.

Embodiment 54. The method of embodiment 53, wherein the indication field is a transmit power control (TPC) command for the second transmission.

Embodiment 55. The method of any one of embodiments 46 to 54, wherein the DCI has a format of at least one of the followings: DCI format 0_0, DCI format 0_1, DCI format 0_2, DCI format 2_2, or DCI format 2_0.

Embodiment 56. A wireless communication method, by a base station comprising:

performing communication, by the base station with a user equipment (UE), wherein the communication comprises that the base station is configured to transmit, to the UE, a first indication comprising an antenna polarization used by the base station and/or a satellite to transmit and/or receive a transmission; and/or the base station is configured to transmit, to the UE, a second indication comprising the antenna polarization used by the UE to transmit and/or receive a transmission.

Embodiment 57. The method of embodiment 56, wherein the first indication and/or the second indication are indicated in at least one of the followings: a system information, a UE-specific radio resource control (RRC) message, a medium access control (MAC) control element (CE), or downlink control information (DCI).

Embodiment 58. The method of embodiment 56 or 57, wherein the antenna polarization comprises a transmitter antenna polarization and/or a receiver antenna polarization.

Embodiment 59. The method of any one of embodiments 56 to 58, wherein the antenna polarization comprises at least one of the followings: a first polarization type, a second polarization type, or a third polarization type.

Embodiment 60. The method of embodiment 59, wherein the first polarization type comprises a linear polarization.

Embodiment 61. The method of embodiment 59 or 60, wherein the second polarization type comprises a right-hand circular polarization (RHCP).

Embodiment 62. The method of any one of embodiments 59 to 61, wherein the third polarization type comprises a left-hand circular polarization (LHCP).

Embodiment 63. The method of any one of embodiments 56 to 62, wherein when absence of the first indication and/or the second indication, a default polarization is used for transmission and/or for reception.

Embodiment 64. The method of embodiment 63, wherein the default polarization comprises the linear polarization.

Embodiment 65. The method of any one of embodiments 57 to 64, wherein when the first indication is indicated in the system information, a first transmission is transmitted and/or received with the antenna polarization; or when the second indication is indicated in the system information, a second transmission is transmitted and/or received with the antenna polarization.

Embodiment 66. The method of embodiment 65, wherein the first transmission comprises a downlink transmission.

Embodiment 67. The method of embodiment 66, wherein the downlink transmission comprises at least one of the followings: a physical downlink shared channel (PDSCH), a physical downlink control channel (PDCCH), a synchronization signal block (SSB), or a channel state information reference signal (CSI-RS).

Embodiment 68. The method of any one of embodiments 65 to 67, wherein the second transmission comprises an uplink transmission.

Embodiment 69. The method of embodiment 68, wherein the uplink transmission comprises at least one of the followings: a physical uplink shared channel (PUSCH), a physical uplink control channel (PUCCH), a sounding reference signal (SRS), or a physical random access channel (PRACH).

Embodiment 70. The method of any one of embodiments 65 to 69, wherein the first transmission is transmitted from the base station and/or a satellite to the UE.

Embodiment 71. The method of any one of embodiments 65 to 70, wherein the second transmission is transmitted from the UE to the base station and/or the satellite.

Embodiment 72. The method of any one of embodiments 65 to 71, wherein when the first indication is indicated in the system information and the first transmission is transmitted with the antenna polarization, a transmit antenna of the base station and/or the satellite uses the antenna polarization.

Embodiment 73. The method of any one of embodiments 65 to 72, wherein when the first indication is indicated in the system information and the first transmission is received with the antenna polarization, a receiver antenna of the UE uses the antenna polarization.

Embodiment 74. The method of any one of embodiments 65 to 73, wherein when the second indication is indicated in the system information and the second transmission is transmitted with the antenna polarization, a transmit antenna of the UE uses the antenna polarization.

Embodiment 75. The method of any one of embodiments 65 to 74, wherein when the second indication is indicated in the system information and the second transmission is received with the antenna polarization, a receiver antenna of the base station and/or the satellite uses the antenna polarization.

Embodiment 76. The method of any one of embodiments 65 to 75, wherein the base station is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 77. The method of any one of embodiments 65 to 76, wherein when the first indication is indicated in the UE-specific RRC message or the DCI and the first transmission is transmitted with the antenna polarization, a transmit antenna of the base station and/or the satellite uses the antenna polarization.

Embodiment 78. The method of any one of embodiments 65 to 77, wherein when the first indication is indicated in the UE-specific RRC message or the DCI and the first transmission is received with the antenna polarization, a receiver antenna of the UE uses the antenna polarization.

Embodiment 79. The method of any one of embodiments 65 to 78, wherein when the second indication is indicated in the UE-specific RRC message or the DCI and the second transmission is transmitted with the antenna polarization, a transmit antenna of the UE uses the antenna polarization.

Embodiment 80. The method of any one of embodiments 65 to 79, wherein when the second indication is indicated in the UE-specific RRC message or the DCI and the second transmission is received with the antenna polarization, a receiver antenna of the base station and/or the satellite uses the antenna polarization.

Embodiment 81. The method of any one of embodiments 65 to 80, wherein the base station is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 82. The method of any one of embodiments 77 to 81, wherein the first indication and/or the second indication is configured in a bandwidth part (BWP) configuration information element (IE) and/or a measurement object (MeasObj) IE.

Embodiment 83. The method of embodiment 82, wherein the MeasObj IE is an RRC configuration for synchronization signal and physical broadcast channel (SS/PBCH) block(s) intra/inter-frequency measurements and/or CSI-RS intra/inter-frequency measurements.

Embodiment 84. The method of embodiment 82 or 83, wherein in the MeasObj (MO) IE, the base station is configured to configure an antenna polarization for all cells in the same MO identifier (ID).

Embodiment 85. The method of any one of embodiments 82 to 84, wherein in the MO IE, the base station is configured to configure a set of antenna polarizations, each of the antenna polarizations corresponds to one or more cells in the MO ID.

Embodiment 86. The method of embodiment 85, wherein the configured antenna polarization indicates the SSB and/or thee CSI-RS are transmitted with the configured antenna polarization.

Embodiment 87. The method of embodiment 85 or 86, wherein the configured antenna polarization indicates that the UE uses the configured antenna polarization to receive the SSB and/or the CSI-RS.

Embodiment 88. The method of any one of embodiments 82 to 87, wherein the first indication and/or the second indication is associated with one or more serving cells.

Embodiment 89. The method of any one of embodiments 56 to 88, wherein the first indication and/or the second indication is configured in a reference signal configuration.

Embodiment 90. The method of any one of embodiments 65 to 89, wherein when the first indication is indicated in the MAC CE and the first transmission is transmitted with the antenna polarization, a transmit antenna of the base station and/or the satellite uses the antenna polarization.

Embodiment 91. The method of any one of embodiments 65 to 90, wherein when the first indication is indicated in the MAC CE and the first transmission is received with the antenna polarization, a receiver antenna of the UE uses the antenna polarization.

Embodiment 92. The method of any one of embodiments 65 to 91, wherein when the second indication is indicated in the MAC CE and the second transmission is transmitted with the antenna polarization, a transmit antenna of the UE uses the antenna polarization.

Embodiment 93. The method of any one of embodiments 65 to 92, wherein when the second indication is indicated in the MAC CE and the second transmission is received with the antenna polarization, a receiver antenna of the base station and/or the satellite uses the antenna polarization.

Embodiment 94. The method of any one of embodiments 65 to 93, wherein the base station is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 95. The method of any one of embodiments 90 to 94, wherein the first indication and/or the second indication indicated in the MAC CE comprises change and/or activation or deactivation of the antenna polarization.

Embodiment 96. The method of any one of embodiments 90 to 95, wherein the first indication and/or the second indication indicated in the MAC CE comprises that the base station is configured to control the UE to receive a set of antenna polarizations from the base station.

Embodiment 97. The method of embodiment 96, wherein the set of antenna polarizations comprises the linear polarization, the RHCP, and the LHCP.

Embodiment 98. The method of embodiment 96 or 97, wherein the first indication and/or the second indication indicated in the MAC CE comprises that the base station is configured to indicate the UE to change one antenna polarization to another antenna polarization from the set of antenna polarizations.

Embodiment 99. The method of any one of embodiments 56 to 98, wherein the base station is configured to receive from the UE, a UE capability of supporting one or more antenna polarizations.

Embodiment 100. The method of embodiment 99, wherein the UE capability of supporting one or more antenna polarizations comprises that the UE supports the one or more antenna polarizations for transmit antenna and/or receive antenna.

Embodiment 101. The method of any one of embodiments 56 to 100, wherein the base station is configured to indicate the UE whether to increase transmit power to compensate for polarization loss.

Embodiment 102. The method of any one of embodiments 56 to 101, wherein when the base station controls the UE to determine that for the second transmission, there is a polarization mismatch, the UE increases a transmit power to compensate for polarization loss.

Embodiment 103. The method of embodiment 101 or 102, wherein the polarization loss is pre-configured or pre-defined.

Embodiment 104. The method of any one of embodiments 101 to 103, wherein the polarization loss is up to 3 dB.

Embodiment 105. The method of any one of embodiments 101 to 104, wherein the polarization loss is cause by different antenna polarizations used on the base station or the satellite and the UE.

Embodiment 106. The method of any one of embodiments 101 to 105, wherein the transmit power increased by the UE is equal to the polarization loss.

Embodiment 107. The method of any one of embodiments 101 to 106, wherein the base station is configured to indicate the UE via the DCI, and the DCI indicates that the second transmission increases the transmit power or without increasing the transmit power to compensate for polarization loss.

Embodiment 108. The method of any one of embodiments 101 to 107, wherein the DCI comprises an indication field used to indicate whether or not the UE needs to increase the transmit power to compensate for polarization loss.

Embodiment 109. The method of embodiment 108, wherein the indication field is a transmit power control (TPC) command for the second transmission.

Embodiment 110. The method of any one of embodiments 101 to 109, wherein the DCI has a format of at least one of the followings: DCI format 0_0, DCI format 0_1, DCI format 0_2, DCI format 2_2, or DCI format 2_0.

Embodiment 111. A user equipment (UE), comprising:

a memory;

a transceiver; and a processor coupled to the memory and the transceiver;

wherein the processor is configured to perform communication with a base station, wherein the communication comprises that the transceiver is configured to receive, from the base station, a first indication comprising an antenna polarization used by the base station and/or a satellite to transmit and/or receive a transmission; and/or the transceiver is configured to receive, from the base station, a second indication comprising the antenna polarization used by the transceiver to transmit and/or receive a transmission.

Embodiment 112. The UE of embodiment 111, wherein the first indication and/or the second indication are indicated in at least one of the followings: a system information, a UE-specific radio resource control (RRC) message, a medium access control (MAC) control element (CE), or downlink control information (DCI).

Embodiment 113. The UE of embodiment 111 or 112, wherein the antenna polarization comprises a transmitter antenna polarization and/or a receiver antenna polarization.

Embodiment 114. The UE of any one of embodiments 111 to 113, wherein the antenna polarization comprises at least one of the followings: a first polarization type, a second polarization type, or a third polarization type.

Embodiment 115. The UE of embodiment 114, wherein the first polarization type comprises a linear polarization.

Embodiment 116. The UE of embodiment 114 or 115, wherein the second polarization type comprises a right-hand circular polarization (RHCP).

Embodiment 117. The UE of any one of embodiments 114 to 116, wherein the third polarization type comprises a left-hand circular polarization (LHCP).

Embodiment 118. The UE of any one of embodiments 111 to 117, wherein when absence of the first indication and/or the second indication, a default polarization is used for transmission and/or for reception.

Embodiment 119. The UE of embodiment 118, wherein the default polarization comprises the linear polarization.

Embodiment 120. The UE of any one of embodiments 112 to 119, wherein when the first indication is indicated in the system information, a first transmission is transmitted and/or received with the antenna polarization; or when the second indication is indicated in the system information, a second transmission is transmitted and/or received with the antenna polarization.

Embodiment 121. The UE of embodiment 120, wherein the first transmission comprises a downlink transmission.

Embodiment 122. The UE of embodiment 121, wherein the downlink transmission comprises at least one of the followings: a physical downlink shared channel (PDSCH), a physical downlink control channel (PDCCH), a synchronization signal block (SSB), or a channel state information reference signal (CSI-RS).

Embodiment 123. The UE of any one of embodiments 120 to 122, wherein the second transmission comprises an uplink transmission.

Embodiment 124. The UE of embodiment 120, wherein the uplink transmission comprises at least one of the followings: a physical uplink shared channel (PUSCH), a physical uplink control channel (PUCCH), a sounding reference signal (SRS), or a physical random access channel (PRACH).

Embodiment 125. The UE of any one of embodiments 120 to 124, wherein the first transmission is transmitted from the base station and/or a satellite to the transceiver.

Embodiment 126. The UE of any one of embodiments 120 to 125, wherein the second transmission is transmitted from the transceiver to the base station and/or the satellite.

Embodiment 127. The UE of any one of embodiments 120 to 126, wherein when the first indication is indicated in the system information and the first transmission is transmitted with the antenna polarization, a transmit antenna of the base station and/or the satellite uses the antenna polarization.

Embodiment 128. The UE of any one of embodiments 120 to 127, wherein when the first indication is indicated in the system information and the first transmission is received with the antenna polarization, a receiver antenna of the UE uses the antenna polarization.

Embodiment 129. The UE of any one of embodiments 120 to 128, wherein when the second indication is indicated in the system information and the second transmission is transmitted with the antenna polarization, a transmit antenna of the UE uses the antenna polarization.

Embodiment 130. The UE of any one of embodiments 120 to 129, wherein when the second indication is indicated in the system information and the second transmission is received with the antenna polarization, a receiver antenna of the base station and/or the satellite uses the antenna polarization.

Embodiment 131. The UE of any one of embodiments 120 to 130, wherein the processor is configured to adjust the transmitter antenna polarization and/or the receiver antenna polarization of the UE to match with the transmitter antenna polarization and/or the receiver antenna polarization of the base station and/or the satellite antenna polarization.

Embodiment 132. The UE of any one of embodiments 120 to 131, wherein when the first indication is indicated in the UE-specific RRC message or the DCI and the first transmission is transmitted with the antenna polarization, a transmit antenna of the base station and/or the satellite uses the antenna polarization.

Embodiment 133. The UE of any one of embodiments 120 to 132, wherein when the first indication is indicated in the UE-specific RRC message or the DCI and the first transmission is received with the antenna polarization, a receiver antenna of the UE uses the antenna polarization.

Embodiment 134. The UE of any one of embodiments 120 to 133, wherein when the second indication is indicated in the UE-specific RRC message or the DCI and the second transmission is transmitted with the antenna polarization, a transmit antenna of the UE uses the antenna polarization.

Embodiment 135. The UE of any one of embodiments 120 to 134, wherein when the second indication is indicated in the UE-specific RRC message or the DCI and the second transmission is received with the antenna polarization, a receiver antenna of the base station and/or the satellite uses the antenna polarization.

Embodiment 136. The UE of any one of embodiments 120 to 135, wherein the processor is configured to adjust the transmitter antenna polarization and/or the receiver antenna polarization of the UE to match with the transmitter antenna polarization and/or the receiver antenna polarization of the base station and/or the satellite antenna polarization.

Embodiment 137. The UE of any one of embodiments 132 to 136, wherein the first indication and/or the second indication is configured in a bandwidth part (BWP) configuration information element (IE) and/or a measurement object (MeasObj) IE.

Embodiment 138. The UE of embodiment 137, wherein the MeasObj IE is an RRC configuration for synchronization signal and physical broadcast channel (SS/PBCH) block(s) intra/inter-frequency measurements and/or CSI-RS intra/inter-frequency measurements.

Embodiment 139. The UE of embodiment 137 or 138, wherein in the MeasObj (MO) IE, the base station is configured to configure an antenna polarization for all cells in the same MO identifier (ID).

Embodiment 140. The UE of any one of embodiments 137 to 139, wherein in the MO IE, the base station is configured to configure a set of antenna polarizations, each of the antenna polarizations corresponds to one or more cells in the MO ID.

Embodiment 141. The UE of embodiment 140, wherein the configured antenna polarization indicates the SSB and/or thee CSI-RS are transmitted with the configured antenna polarization.

Embodiment 142. The UE of embodiment 140 or 141, wherein the configured antenna polarization indicates that the UE uses the configured antenna polarization to receive the SSB and/or the CSI-RS.

Embodiment 143. The UE of any one of embodiments 137 to 142, wherein the first indication and/or the second indication is associated with one or more serving cells.

Embodiment 144. The UE of any one of embodiments 111 to 143, wherein the first indication and/or the second indication is configured in a reference signal configuration.

Embodiment 145. The UE of any one of embodiments 120 to 144, wherein when the first indication is indicated in the MAC CE and the first transmission is transmitted with the antenna polarization, a transmit antenna of the base station and/or the satellite uses the antenna polarization.

Embodiment 146. The UE of any one of embodiments 120 to 145, wherein when the first indication is indicated in the MAC CE and the first transmission is received with the antenna polarization, a receiver antenna of the UE uses the antenna polarization.

Embodiment 147. The UE of any one of embodiments 120 to 146, wherein when the second indication is indicated in the MAC CE and the second transmission is transmitted with the antenna polarization, a transmit antenna of the UE uses the antenna polarization.

Embodiment 148. The UE of any one of embodiments 120 to 147, wherein when the second indication is indicated in the MAC CE and the second transmission is received with the antenna polarization, a receiver antenna of the base station and/or the satellite uses the antenna polarization.

Embodiment 149. The UE of any one of embodiments 120 to 148, wherein the processor is configured to adjust the transmitter antenna polarization and/or the receiver antenna polarization of the UE to match with the transmitter antenna polarization and/or the receiver antenna polarization of the base station and/or the satellite antenna polarization.

Embodiment 150. The UE of any one of embodiments 121 to 149, wherein the first indication and/or the second indication indicated in the MAC CE comprises change and/or activation or deactivation of the antenna polarization.

Embodiment 151. The UE of any one of embodiments 121 to 150, wherein the first indication and/or the second indication indicated in the MAC CE comprises that the transceiver is configured to receive a set of antenna polarizations from the base station.

Embodiment 152. The UE of embodiment 151, wherein the set of antenna polarizations comprises the linear polarization, the RHCP, and the LHCP.

Embodiment 153. The UE of embodiment 151 or 152, wherein the first indication and/or the second indication indicated in the MAC CE comprises that the processor is indicated by the base station to change one antenna polarization to another antenna polarization from the set of antenna polarizations.

Embodiment 154. The UE of any one of embodiments 111 to 153, wherein the processor is configured to report to the base station, a UE capability of supporting one or more antenna polarizations.

Embodiment 155. The UE of embodiment 154, wherein the UE capability of supporting one or more antenna polarizations comprises that the UE supports the one or more antenna polarizations for transmit antenna and/or receive antenna.

Embodiment 156. The UE of any one of embodiments 111 to 155, wherein the processor is indicated by the base station whether to increase transmit power to compensate for polarization loss.

Embodiment 157. The UE of any one of embodiments 111 to 156, wherein when the processor determines that for the second transmission, there is a polarization mismatch, the processor increases a transmit power to compensate for polarization loss.

Embodiment 158. The UE of embodiment 156 or 157, wherein the polarization loss is pre-configured or pre-defined.

Embodiment 159. The UE of any one of embodiments 156 to 158, wherein the polarization loss is up to 3 dB.

Embodiment 160. The UE of any one of embodiments 156 to 159, wherein the polarization loss is cause by different antenna polarizations used on the base station or the satellite and the UE.

Embodiment 161. The UE of any one of embodiments 156 to 160, wherein the transmit power increased by the processor is equal to the polarization loss.

Embodiment 162. The UE of any one of embodiments 156 to 161, wherein the processor is indicated with the DCI by the base station, and the DCI indicates that the second transmission increases the transmit power or without increasing the transmit power to compensate for polarization loss.

Embodiment 163. The UE of any one of embodiments 156 to 162, wherein the DCI comprises an indication field used to indicate whether or not the processor needs to increase the transmit power to compensate for polarization loss.

Embodiment 164. The UE of embodiment 163, wherein the indication field is a transmit power control (TPC) command for the second transmission.

Embodiment 165. The UE of any one of embodiments 156 to 164, wherein the DCI has a format of at least one of the followings: DCI format 0_0, DCI format 0_1, DCI format 0_2, DCI format 2_2, or DCI format 2_0.

Embodiment 166. A base station, comprising:

a memory;

a transceiver; and a processor coupled to the memory and the transceiver;

wherein the processor is configured to perform communication with a user equipment (UE), wherein the communication comprises that the transceiver is configured to transmit, to the UE, a first indication comprising an antenna polarization used by the base station and/or a satellite to transmit and/or receive a transmission; and/or the transceiver is configured to transmit, to the UE, a second indication comprising the antenna polarization used by the UE to transmit and/or receive a transmission.

Embodiment 167. The base station of embodiment 166, wherein the first indication and/or the second indication are indicated in at least one of the followings: a system information, a UE-specific radio resource control (RRC) message, a medium access control (MAC) control element (CE), or downlink control information (DCI).

Embodiment 168. The base station of embodiment 166 or 167, wherein the antenna polarization comprises a transmitter antenna polarization and/or a receiver antenna polarization.

Embodiment 169. The base station of any one of embodiments 166 to 168, wherein the antenna polarization comprises at least one of the followings: a first polarization type, a second polarization type, or a third polarization type.

Embodiment 170. The base station of embodiment 169, wherein the first polarization type comprises a linear polarization.

Embodiment 171. The base station of embodiment 169 or 170, wherein the second polarization type comprises a right-hand circular polarization (RHCP).

Embodiment 172. The base station of any one of embodiments 169 to 171, wherein the third polarization type comprises a left-hand circular polarization (LHCP).

Embodiment 173. The base station of any one of embodiments 166 to 172, wherein when absence of the first indication and/or the second indication, a default polarization is used for transmission and/or for reception.

Embodiment 174. The base station of embodiment 173, wherein the default polarization comprises the linear polarization.

Embodiment 175. The base station of any one of embodiments 167 to 174, wherein when the first indication is indicated in the system information, a first transmission is transmitted and/or received with the antenna polarization; or when the second indication is indicated in the system information, a second transmission is transmitted and/or received with the antenna polarization.

Embodiment 176. The base station of embodiment 175, wherein the first transmission comprises a downlink transmission.

Embodiment 177. The base station of embodiment 176, wherein the downlink transmission comprises at least one of the followings: a physical downlink shared channel (PDSCH), a physical downlink control channel (PDCCH), a synchronization signal block (SSB), or a channel state information reference signal (CSI-RS).

Embodiment 178. The base station of any one of embodiments 175 to 177, wherein the second transmission comprises an uplink transmission.

Embodiment 179. The base station of embodiment 178, wherein the uplink transmission comprises at least one of the followings: a physical uplink shared channel (PUSCH), a physical uplink control channel (PUCCH), a sounding reference signal (SRS), or a physical random access channel (PRACH).

Embodiment 180. The base station of any one of embodiments 175 to 179, wherein the first transmission is transmitted from the transceiver and/or a satellite to the UE.

Embodiment 181. The base station of any one of embodiments 175 to 180, wherein the second transmission is transmitted from the UE to the transceiver and/or the satellite.

Embodiment 182. The base station of any one of embodiments 175 to 181, wherein when the first indication is indicated in the system information and the first transmission is transmitted with the antenna polarization, a transmit antenna of the base station and/or the satellite uses the antenna polarization.

Embodiment 183. The base station of any one of embodiments 175 to 182, wherein when the first indication is indicated in the system information and the first transmission is received with the antenna polarization, a receiver antenna of the UE uses the antenna polarization.

Embodiment 184. The base station of any one of embodiments 175 to 183, wherein when the second indication is indicated in the system information and the second transmission is transmitted with the antenna polarization, a transmit antenna of the UE uses the antenna polarization.

Embodiment 185. The base station of any one of embodiments 175 to 184, wherein when the second indication is indicated in the system information and the second transmission is received with the antenna polarization, a receiver antenna of the base station and/or the satellite uses the antenna polarization.

Embodiment 186. The base station of any one of embodiments 175 to 185, wherein the processor is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 187. The base station of any one of embodiments 175 to 186, wherein when the first indication is indicated in the UE-specific RRC message or the DCI and the first transmission is transmitted with the antenna polarization, a transmit antenna of the base station and/or the satellite uses the antenna polarization.

Embodiment 188. The base station of any one of embodiments 175 to 187, wherein when the first indication is indicated in the UE-specific RRC message or the DCI and the first transmission is received with the antenna polarization, a receiver antenna of the UE uses the antenna polarization.

Embodiment 189. The base station of any one of embodiments 175 to 188, wherein when the second indication is indicated in the UE-specific RRC message or the DCI and the second transmission is transmitted with the antenna polarization, a transmit antenna of the UE uses the antenna polarization.

Embodiment 190. The base station of any one of embodiments 175 to 189, wherein when the second indication is indicated in the UE-specific RRC message or the DCI and the second transmission is received with the antenna polarization, a receiver antenna of the base station and/or the satellite uses the antenna polarization.

Embodiment 191. The base station of any one of embodiments 175 to 190, wherein the processor is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 192. The base station of any one of embodiments 187 to 191, wherein the first indication and/or the second indication is configured in a bandwidth part (BWP) configuration information element (IE) and/or a measurement object (MeasObj) IE.

Embodiment 193. The base station of embodiment 192, wherein the MeasObj IE is an RRC configuration for synchronization signal and physical broadcast channel (SS/PBCH) block(s) intra/inter-frequency measurements and/or CSI-RS intra/inter-frequency measurements.

Embodiment 194. The base station of embodiment 192 or 193, wherein in the MeasObj (MO) IE, the base station is configured to configure an antenna polarization for all cells in the same MO identifier (ID).

Embodiment 195. The base station of any one of embodiments 192 to 194, wherein in the MO IE, the base station is configured to configure a set of antenna polarizations, each of the antenna polarizations corresponds to one or more cells in the MO ID.

Embodiment 196. The base station of embodiment 195, wherein the configured antenna polarization indicates the SSB and/or thee CSI-RS are transmitted with the configured antenna polarization.

Embodiment 197. The base station of embodiment 195 or 196, wherein the configured antenna polarization indicates that the UE uses the configured antenna polarization to receive the SSB and/or the CSI-RS.

Embodiment 198. The base station of any one of embodiment 192 to 197, wherein the first indication and/or the second indication is associated with one or more serving cells.

Embodiment 199. The base station of any one of embodiments 166 to 198, wherein the first indication and/or the second indication is configured in a reference signal configuration.

Embodiment 200. The base station of any one of embodiments 175 to 199, wherein when the first indication is indicated in the MAC CE and the first transmission is transmitted with the antenna polarization, a transmit antenna of the base station and/or the satellite uses the antenna polarization.

Embodiment 201. The base station of any one of embodiments 175 to 200, wherein when the first indication is indicated in the MAC CE and the first transmission is received with the antenna polarization, a receiver antenna of the UE uses the antenna polarization.

Embodiment 202. The base station of any one of embodiments 175 to 201, wherein when the second indication is indicated in the MAC CE and the second transmission is transmitted with the antenna polarization, a transmit antenna of the UE uses the antenna polarization.

Embodiment 203. The base station of any one of embodiments 175 to 202, wherein when the second indication is indicated in the MAC CE and the second transmission is received with the antenna polarization, a receiver antenna of the base station and/or the satellite uses the antenna polarization.

Embodiment 204. The base station of any one of embodiments 175 to 203, wherein the processor is configured to control the UE to adjust the transmitter antenna polarization and/or the receiver antenna polarization of the UE to match with the transmitter antenna polarization and/or the receiver antenna polarization of the base station and/or the satellite antenna polarization.

Embodiment 205. The base station of any one of embodiments 200 to 204, wherein the first indication and/or the second indication indicated in the MAC CE comprises change and/or activation or deactivation of the antenna polarization.

Embodiment 206. The base station of any one of embodiments 200 to 205, wherein the first indication and/or the second indication indicated in the MAC CE comprises that the processor is configured to control the UE to receive a set of antenna polarizations from the base station.

Embodiment 207. The base station of embodiment 206, wherein the set of antenna polarizations comprises the linear polarization, the RHCP, and the LHCP.

Embodiment 208. The base station of embodiment 206 or 207, wherein the first indication and/or the second indication indicated in the MAC CE comprises that the processor is configured to indicate the UE to change one antenna polarization to another antenna polarization from the set of antenna polarizations.

Embodiment 209. The base station of any one of embodiments 166 to 208, wherein the transceiver is configured to receive from the UE, a UE capability of supporting one or more antenna polarizations.

Embodiment 210. The base station of embodiment 209, wherein the UE capability of supporting one or more antenna polarizations comprises that the UE supports the one or more antenna polarizations for transmit antenna and/or receive antenna.

Embodiment 211. The base station of any one of embodiments 166 to 210, wherein the processor is configured to indicate the UE whether to increase transmit power to compensate for polarization loss.

Embodiment 212. The base station of any one of embodiments 166 to 211, wherein when the processor controls the UE to determine that for the second transmission, there is a polarization mismatch, the UE increases a transmit power to compensate for polarization loss.

Embodiment 213. The base station of embodiment 211 or 212, wherein the polarization loss is pre-configured or pre-defined.

Embodiment 214. The base station of any one of embodiments 211 to 213, wherein the polarization loss is up to 3 dB.

Embodiment 215. The base station of any one of embodiments 211 to 214, wherein the polarization loss is cause by different antenna polarizations used on the base station or the satellite and the UE.

Embodiment 216. The base station of any one of embodiments 211 to 215, wherein the transmit power increased by the UE is equal to the polarization loss.

Embodiment 217. The base station of any one of embodiments 211 to 216, wherein the processor is configured to indicate the UE via the DCI, and the DCI indicates that the second transmission increases the transmit power or without increasing the transmit power to compensate for polarization loss.

Embodiment 218. The base station of any one of embodiments 211 to 217, wherein the DCI comprises an indication field used to indicate whether or not the UE needs to increase the transmit power to compensate for polarization loss.

Embodiment 219. The base station of embodiment 218, wherein the indication field is a transmit power control (TPC) command for the second transmission.

Embodiment 220. The base station of any one of embodiments 211 to 219, wherein the DCI has a format of at least one of the followings: DCI format 0_0, DCI format 0_1, DCI format 0_2, DCI format 2_2, or DCI format 2_0.

Embodiment 221. A non-transitory machine-readable storage medium having stored thereon instructions that, when executed by a computer, cause the computer to perform the method of any one of embodiments 1 to 110.

Embodiment 222. A chip, comprising:

a processor, configured to call and run a computer program stored in a memory, to cause a device in which the chip is installed to execute the method of any one of embodiments 1 to 110.

Embodiment 223. A computer readable storage medium, in which a computer program is stored, wherein the computer program causes a computer to execute the method of any one of embodiments 1 to 110.

Embodiment 224. A computer program product, comprising a computer program, wherein the computer program causes a computer to execute the method of any one of embodiments 1 to 110.

Embodiment 225. A computer program, wherein the computer program causes a computer to execute the method of any one of embodiments 1 to 110.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

performing communication, by the UE with a base station, wherein the communication comprises that the UE is configured to receive, from the base station, a first indication comprising an antenna polarization used by the base station and/or a satellite to transmit and/or receive a transmission; and/or the UE is configured to receive, from the base station, a second indication comprising the antenna polarization used by the UE to transmit and/or receive a transmission, wherein when the first indication is indicated in a UE-specific radio resource control (RRC) message, the first indication is configured in a bandwidth part (BWP) configuration information element (IE) and/or a measurement object (MeasObj) IE; and/or when the second indication is indicated in the UE-specific RRC message, the second indication is configured in the BWP configuration IE and/or the MeasObj IE, wherein at least one of the following applies:

when the first indication is indicated in the UE-specific RRC message or downlink control information (DCI) and a first transmission is transmitted with the antenna polarization, a transmit antenna of the base station and/or the satellite uses the antenna polarization;

when the first indication is indicated in the UE-specific RRC message or the DCI and the first transmission is received with the antenna polarization, a receiver antenna of the UE uses the antenna polarization;

when the second indication is indicated in the UE-specific RRC message or the DCI and a second transmission is transmitted with the antenna polarization, a transmit antenna of the UE uses the antenna polarization; or when the second indication is indicated in the UE-specific RRC message or the DCI and the second transmission is received with the antenna polarization, a receiver antenna of the base station and/or the satellite uses the antenna polarization.

2. The method of claim 1, wherein the antenna polarization comprises at least one of the followings: a first polarization type, a second polarization type, or a third polarization type;

wherein at least one of the following applies:

the first polarization type comprises a linear polarization, the second polarization type comprises a right-hand circular polarization (RHCP), or the third polarization type comprises a left-hand circular polarization (LHCP).

3. The method of claim 1, wherein when absence of the first indication and/or the second indication, a default polarization is used for transmission and/or for reception, wherein the default polarization comprises a linear polarization.

4. The method of claim 1, wherein the MeasObj IE is an RRC configuration for synchronization signal and physical broadcast channel (SS/PBCH) block(s) intra/inter-frequency measurements and/or CSI-RS intra/inter-frequency measurements, wherein at least one of the following applies:

in the MeasObj (MO) IE, the base station is configured to configure an antenna polarization for all cells in the same MO identifier (ID); or in the MO IE, the base station is configured to configure a set of antenna polarizations, each of the antenna polarizations corresponds to one or more cells in the MO ID, wherein the configured antenna polarization indicates the SSB and/or thee CSI-RS are transmitted with the configured antenna polarization and/or the configured antenna polarization indicates that the UE uses the configured antenna polarization to receive the SSB and/or the CSI-RS.

5. The method of claim 1, wherein the UE is configured to report to the base station, a UE capability of supporting one or more antenna polarizations, wherein the UE capability of supporting one or more antenna polarizations comprises that the UE supports the one or more antenna polarizations for transmit antenna and/or receive antenna.

6. A wireless communication method, by a base station comprising:

performing communication, by the base station with a user equipment (UE), wherein the communication comprises that the base station is configured to transmit, to the UE, a first indication comprising an antenna polarization used by the base station and/or a satellite to transmit and/or receive a transmission; and/or the base station is configured to transmit, to the UE, a second indication comprising the antenna polarization used by the UE to transmit and/or receive a transmission, wherein when the first indication is indicated in a UE-specific radio resource control (RRC) message, the first indication is configured in a bandwidth part (BWP) configuration information element (IE) and/or a measurement object (MeasObj) IE; and/or when the second indication is indicated in the UE-specific RRC message, the second indication is configured in the BWP configuration IE and/or the MeasObj IE, wherein at least one of the following applies:

when the first indication is indicated in the UE-specific RRC message or downlink control information (DCI)

and a first transmission is transmitted with the antenna polarization, a transmit antenna of the base station and/or the satellite uses the antenna polarization;

when the first indication is indicated in the UE-specific RRC message or the DCI and the first transmission is received with the antenna polarization, a receiver antenna of the UE uses the antenna polarization;

when the second indication is indicated in the UE-specific RRC message or the DCI and a second transmission is transmitted with the antenna polarization, a transmit antenna of the UE uses the antenna polarization; or when the second indication is indicated in the UE-specific RRC message or the DCI and the second transmission is received with the antenna polarization, a receiver antenna of the base station and/or the satellite uses the antenna polarization.

7. The method of claim 6, wherein the first indication and/or the second indication is associated with one or more serving cells.

8. The method of claim 6, wherein at least one of the following applies:

when the first indication is indicated in a medium access control (MAC) control element (CE) and the first transmission is transmitted with the antenna polarization, a transmit antenna of the base station and/or the satellite uses the antenna polarization;

when the first indication is indicated in the MAC CE and the first transmission is received with the antenna polarization, a receiver antenna of the UE uses the antenna polarization;

when the second indication is indicated in the MAC CE and the second transmission is transmitted with the antenna polarization, a transmit antenna of the UE uses the antenna polarization; or when the second indication is indicated in the MAC CE and the second transmission is received with the antenna polarization, a receiver antenna of the base station and/or the satellite uses the antenna polarization.

9. The method of claim 8, wherein at least one of the following applies:

the first indication and/or the second indication indicated in the MAC CE comprises change and/or activation or deactivation of the antenna polarization;

the first indication and/or the second indication indicated in the MAC CE comprises that the base station is configured to control the UE to receive a set of antenna polarizations from the base station, wherein the set of antenna polarizations comprises the linear polarization, the RHCP, and the LHCP; or the first indication and/or the second indication indicated in the MAC CE comprises that the base station is configured to indicate the UE to change one antenna polarization to another antenna polarization from the set of antenna polarizations.

10. A user equipment (UE), comprising:

a memory;

a transceiver; and a processor coupled to the memory and the transceiver, wherein the processor is configured to perform communication with a base station, wherein the communication comprises that the transceiver is configured to receive, from the base station, a first indication comprising an antenna polarization used by the base station and/or a satellite to transmit and/or receive a transmission; and/or the transceiver is configured to receive, from the base station, a second indication comprising the antenna polarization used by the transceiver to transmit and/or receive a transmission, wherein when the first indication is indicated in a UE-specific radio resource control (RRC) message, the first indication is configured in a bandwidth part (BWP) configuration information element (IE) and/or a measurement object (MeasObj) IE; and/or when the second indication is indicated in the UE-specific RRC message, the second indication is configured in the BWP configuration IE and/or the MeasObj IE, wherein at least one of the following applies:

when the first indication is indicated in the UE-specific RRC message or downlink control information (DCI) and a first transmission is transmitted with the antenna polarization, a transmit antenna of the base station and/or the satellite uses the antenna polarization;

when the first indication is indicated in the UE-specific RRC message or downlink control information (DCI) and the first transmission is received with the antenna polarization, a receiver antenna of the UE uses the antenna polarization;

when the second indication is indicated in the UE-specific RRC message or downlink control information (DCI) and a second transmission is transmitted with the antenna polarization, a transmit antenna of the UE uses the antenna polarization; or when the second indication is indicated in the UE-specific RRC message or downlink control information (DCI) and the second transmission is received with the antenna polarization, a receiver antenna of the base station and/or the satellite uses the antenna polarization.

11. A base station, comprising:

a memory;

a transceiver; and a processor coupled to the memory and the transceiver, wherein the processor is configured to perform communication with a user equipment (UE), wherein the communication comprises that the transceiver is configured to transmit, to the UE, a first indication comprising an antenna polarization used by the base station and/or a satellite to transmit and/or receive a transmission; and/or the transceiver is configured to transmit, to the UE, a second indication comprising the antenna polarization used by the UE to transmit and/or receive a transmission, wherein when the first indication is indicated in a UE-specific radio resource control (RRC) message, the first indication is configured in a bandwidth part (BWP) configuration information element (IE) and/or a measurement object (MeasObj) IE; and/or when the second indication is indicated in the UE-specific RRC message, the second indication is configured in the BWP configuration IE and/or the MeasObj IE, wherein at least one of the following applies:

when the first indication is indicated in the UE-specific RRC message or downlink control information (DCI) and a first transmission is transmitted with the antenna polarization, a transmit antenna of the base station and/or the satellite uses the antenna polarization;

when the first indication is indicated in the UE-specific RRC message or the DCI and the first transmission is received with the antenna polarization, a receiver antenna of the UE uses the antenna polarization;

when the second indication is indicated in the UE-specific RRC message or the DCI and a second transmission is transmitted with the antenna polarization, a transmit antenna of the UE uses the antenna polarization; or when the second indication is indicated in the UE-specific RRC message or the DCI and the second transmission is received with the antenna polarization, a receiver antenna of the base station and/or the satellite uses the antenna polarization.

12. The UE of claim 10, wherein the antenna polarization comprises at least one of the followings: a first polarization type, a second polarization type, or a third polarization type;

wherein at least one of the following applies:

the first polarization type comprises a linear polarization, the second polarization type comprises a right-hand circular polarization (RHCP), or the third polarization type comprises a left-hand circular polarization (LHCP).

13. The UE of claim 10, wherein when absence of the first indication and/or the second indication, a default polarization is used for transmission and/or for reception, wherein the default polarization comprises a linear polarization.

14. The UE of claim 10, wherein the MeasObj IE is an RRC configuration for synchronization signal and physical broadcast channel (SS/PBCH) block(s) intra/inter-frequency measurements and/or CSI-RS intra/inter-frequency measurements, wherein at least one of the following applies:

in the MeasObj (MO) IE, the base station is configured to configure an antenna polarization for all cells in the same MO identifier (ID); or in the MO IE, the base station is configured to configure a set of antenna polarizations, each of the antenna polarizations corresponds to one or more cells in the MO ID, wherein the configured antenna polarization indicates the SSB and/or thee CSI-RS are transmitted with the configured antenna polarization and/or the configured antenna polarization indicates that the UE uses the configured antenna polarization to receive the SSB and/or the CSI-RS.

15. The UE of claim 10, wherein at least one of the following applies:

when the first indication is indicated in a medium access control (MAC) control element (CE) and the first transmission is transmitted with the antenna polarization, a transmit antenna of the base station and/or the satellite uses the antenna polarization;

when the first indication is indicated in the MAC CE and the first transmission is received with the antenna polarization, a receiver antenna of the UE uses the antenna polarization;

when the second indication is indicated in the MAC CE and the second transmission is transmitted with the antenna polarization, a transmit antenna of the UE uses the antenna polarization; or when the second indication is indicated in the MAC CE and the second transmission is received with the antenna polarization, a receiver antenna of the base station and/or the satellite uses the antenna polarization.

16. The base station of claim 11, wherein at least one of the following applies:

when the first indication is indicated in a medium access control (MAC) control element (CE) and the first transmission is transmitted with the antenna polarization, a transmit antenna of the base station and/or the satellite uses the antenna polarization;

when the first indication is indicated in the MAC CE and the first transmission is received with the antenna polarization, a receiver antenna of the UE uses the antenna polarization;

when the second indication is indicated in the MAC CE and the second transmission is transmitted with the antenna polarization, a transmit antenna of the UE uses the antenna polarization; or when the second indication is indicated in the MAC CE and the second transmission is received with the antenna polarization, a receiver antenna of the base station and/or the satellite uses the antenna polarization.

* * * * *